Aug. 28, 1956
J. PALMIERI ET AL
2,760,538
DE-SHELLER FOR HARD BOILED EGGS
Filed July 20, 1953
2 Sheets-Sheet 1
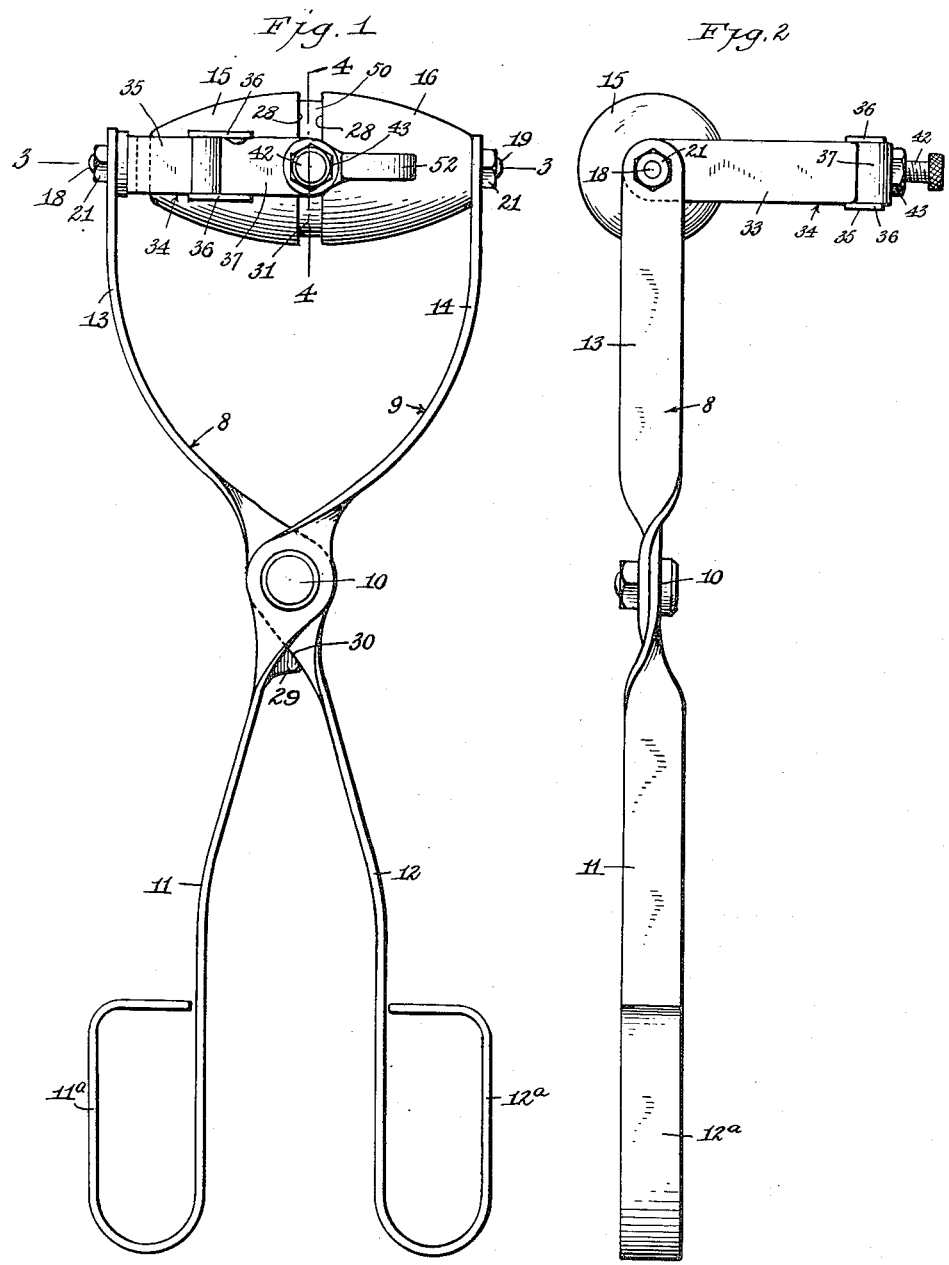

Aug. 28, 1956  J. PALMIERI ET AL  2,760,538
DE-SHELLER FOR HARD BOILED EGGS
Filed July 20, 1953  2 Sheets-Sheet 2
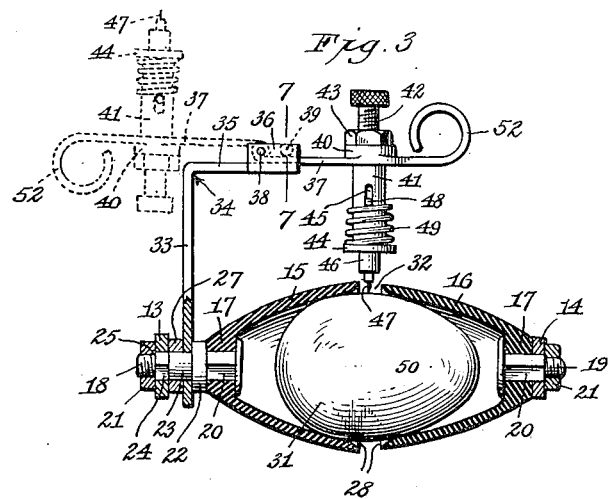
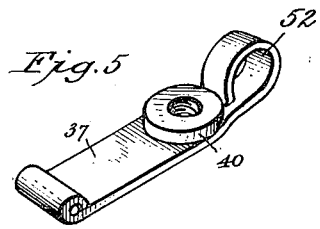
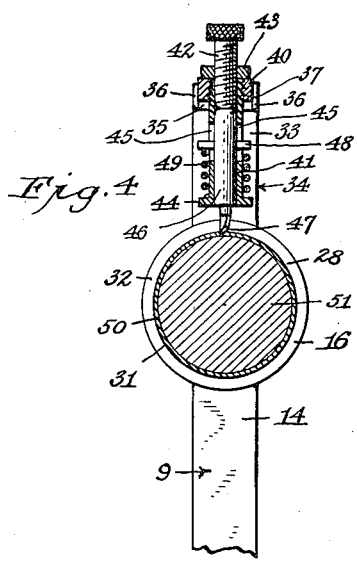
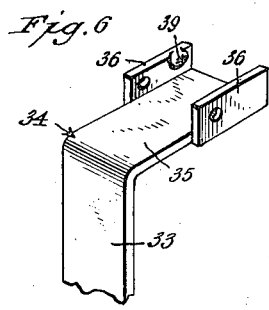
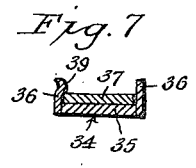
Joseph Palmieri
Peter Peritano  Inventors
By Emil Gunhart
Attorney.

United States Patent Office 2,760,538
Patented Aug. 28, 1956

2,760,538

DE-SHELLER FOR HARD BOILED EGGS

Joseph Palmieri, Buffalo, and Peter Peritano,
West Seneca, N. Y.

Application July 20, 1953, Serial No. 368,971

5 Claims. (Cl. 146—2)

This invention relates to a device for de-shelling hard-boiled eggs.

One of the objects of our invention is to provide a device which is simple in construction, inexpensive to produce, and efficient in action.

Another object is to provide such a device which is capable of de-shelling eggs of different sizes and to provide means whereby the shell of the egg only will be penetrated and separated into two halves so that the contents of the eggs will be removed intact by mere separation of the two halves of the shell under action of the device.

Another object is to so construct the device that the hands of the user need not touch the contents of the eggs and so that the closing of the device will receive any egg, regardless of size, within the device and retain the same in position for de-shelling, and after severing the shell of the egg into two halves will, upon opening of the device cause the severed parts of the egg shell to be retained in the device and the meat of the egg to be separated from the shell portions so that it can be conveniently deposited in a pan or other suitable dish.

A further object is to provide a device of the type mentioned with suction cups movable toward and from each other and into which opposite ends of an egg can be entered with an exposed circumferential area between the cups; in associating with said cups cutting means to engage said exposed circumferential area by cutting through the shell of the egg so that the meat of the egg can be removed from the shell.

A still further object is to provide a device comprising two combined handle and supporting members which are crossed and pivotally connected at their point of crossing to provide hand grips at one of their ends and supporting means at their other ends co-axially supporting cup-like members or egg holders, preferably formed of yielding material, to receive opposite ends of an egg with a free or exposed circumferential area for the egg between the egg holders, and to associate therewith a cutter to move orbitally around said free or exposed area and penetrate the egg shell and under its orbital movement sever the latter into two halves; such elements being so associated that upon closing the supporting ends of said combined handle and supporting members under movement of the gripping ends thereof toward each other, hard-boiled eggs and eggs boiled to convert the soft albumen into firm whites, when boiled or placed within a pan or other dish can be taken up and positioned in the egg holders by the mere closing of the device upon the eggs, and under reverse movement of the device, after severing the shells into two halves, the shell halves will be retained in the egg holders under suction and the meat of the egg removed from the shell halves. The eggs so removed can be deposited in a pan without personally touching the same, after which the shell halves can be withdrawn from the egg-holder and the operation repeated.

With the above and other objects in view, our invention consists in the novel features of construction and in the arrangement and combination of parts to be hereinafter described and more particularly pointed out in the subjoined claims.

In the drawings:

Fig. 1 is a front elevation of our improved device.

Fig. 2 is a side elevation of the same.

Fig. 3 is a transverse section taken on line 3—3, Fig. 1.

Fig. 4 is a transverse section taken on line 4—4, Fig. 1.

Fig. 5 is a detached perspective view of the pivoted carrier or cutter holder.

Fig. 6 is a perspective view of a portion of the cutter-holder supporting member.

Fig. 7 is a cross section taken on line 7—7, Fig. 3.

Having reference to the drawings in detail, the device comprises a tong-like structure having two crossed members 8, 9, which are pivotally connected at their point of crossing as at 10, so that spaced-apart handle arms 11, 12 are provided which extend inwardly from the pivotal connection 10 and are looped at their free ends, as at 11ª and 12ª, respectively, to form hand-grips by means of which the crossed members are manipulated in the manner of an ordinary plier or ice-tongs. Those portions of the crossed members 8 and 9 extending outwardly from the pivotal connection 10 are designated by the numerals 13 and 14, and serve as cup-supporting members or elements, or more particularly cup-supporting arms, to the outer ends of which egg-receiving cups 15, 16, respectively, are secured. These cups are closed at one end, as shown, at 17, and by means of flat-headed bolts 18, 19, passed through the closed ends and through the outer ends of the arms 13 and 14 the cups are securely and non-rotatably fastened to the outer ends of said arms. For this purpose the bolts may be provided with square or other non-circular portions 20 fitted into the closed ends of said cups and have nuts 21 applied to their outer ends to fasten the parts together. The bolt 18 is made somewhat longer than the bolt 19 and it is provided with a flange 22 which bears against the closed end of the adjacent cup 15. Adjacent said flange is a cylindrical portion 23 whose outer end bears against the inner face of the arm 13 supporting said cup. Adjacent the cylindrical portion 23 the said bolt is provided with a square or other non-cylindrical portion 24 fitted into a correspondingly-shaped opening formed in the adjacent cup-supporting arm 13; the outer end of said bolt being reduced in diameter, as at 25, and threaded to receive the nut 21 which is associated with said bolt to fasten the cup 15 non-rotatably to said cup-supporting arm.

Surrounding the cylindrical portion 23 of said bolt is a spacer 27 between which and the flange 22 a part of shell cutter mechanism, to be presently described, is arranged so as to rotate on the cylindrical portion 23 of the bolt 18. The egg-receiving cups 15 and 16 are of substantially frusto-conical shape and are flared inwardly from their outer or closed ends and non-rotatably secured to the cup-supporting arms 13, 14 in the manner described, or otherwise. The inner ends 28 of the cups are open and confront each other and they are slightly spaced-apart when the handle arms are swung to the limit of their inward positions to establish a narrow circumferential space between the two. The handle arm 11 adjacent the pivotal connection 10 is provided with a stop lug 29 which bears against the inner edge of the handle arm 12, as clearly shown at 30, Fig. 1. The degree of separation of the egg-receiving cups is primarily determined by the closing of the cup-supporting arms 13 and 14, controlled by the manipulation of the handle arms 11 and 12.

The egg-receiving cups 15, 16 are constructed of rubber or other flexible material easily extensible under internal pressure such as created by closing the cups when separated over opposite ends of an egg, designated by the numeral 31, and the degree of expansion of the walls of these cups is determined by the size of the egg received into them. Since eggs vary in size the smaller eggs will enter the cups to a degree greater than when a large size egg enters the same. However the cups are of a diameter at their inner open ends that they will have contact with the egg circumferentially at all points so as to create suction when separating the cups and the flexibility of the walls of the cups will assure such contact regardless of the size of the egg, leaving the slight space 32 between the edges or rims of the walls of the cups at their open ends.

Shell-cutting means for penetrating and circumferentially severing the shell of the egg where exposed between the inner open ends of the cups 15, 16 are provided and such means is rotatably mounted on the cylindrical portion 23 of the bolt 18 and comprises a supporting or carrier arm 33 having an opening into which the cylindrical portion 23 of the bolt 18 is fitted; said arm extending radially from the bolt and forming a part of a cutter-supporting member 34. The inner end of this supporting or carrier arm is therefore freely movable between the flange 22 of bolt 18 and the spacer 27 fitted onto the cylindrical portion of said bolt. The supporting or carrier arm 33 is bent at a right angle at its outer end, as at 35, to serve as a retainer arm and said retainer arm has extending outwardly therefrom longitudinal flanges 36 to which a cutter arm 37 is pivotally connected, as shown at 38. Said supporting or carrier arm 33 and the retainer arm 35 serve as a carrier structure for the cutter mechanism to be presently described. One of said flanges is provided with a retainer nub 39 over which one edge of the cutter arm 37 is adapted to ride and underneath which it is to be retained so that the pivoted end of said cutter arm lies against the upper face of the retainer arm 35.

The cutter arm 37 has a boss 40 extending outwardly therefrom into which one end of a sleeve 41 is threaded from its inner side, said sleeve having the interior at its upper portion threaded to receive an adjusting screw 42 onto which a jam nut 43 is threaded which bears against the outer face of the boss 40 and thus retains the adjusting screw 42 in any adjusted position. The sleeve 41 extends inwardly from the cutter arm 37 and has an outstanding flange 44 at its inner end and longitudinally disposed slots 45 through its wall at diametrically opposite points. Slidably arranged within the sleeve 41 is a cutter bar 46, the lower end of which has a cutter or pointed knife 47 extending therefrom. Passed through the cutter bar 46 is a pin 48 which projects from said cutter bar and through the slots 45. One end of a compressible spring 49 bears against the projecting ends of said pin and the other end of said spring rests against the flange 44 at the inner end of the sleeve 41.

It will be apparent that the spring acting against the projecting portions of the pin 48 tends to force the cutter bar outwardly, limited of course by the adjusting screw 42, the tightening of which screw causes the cutter or knife 47 to more closely approach the axes of the egg-receiving cups 12, 16 and consequently the axis of an egg when held within said cups. The unthreading of the adjusting screw moves the cutter or knife outwardly with respect to the axis of the egg, whereas the tightening of the screw will move said knife or cutter toward the axis of the egg, slightly compressing the spring 49, as clearly shown in Fig. 4. The cutter or knife is designed to penetrate the shell of the egg, designated by the numeral 50, but only to an extent sufficient to penetrate the shell without entering the meat of the egg, designated by the numeral 51 in said figure.

The cutter mechanism is retained in penetrating and cutting position by the cutter arm 37 being held underneath the retainer nub 39 on one of the longitudinal flanges 36 extending from said cutter arm.

It will be apparent, therefore, that the adjusting screw serves as a stop against the outward movement of the cutter bar 46 under action of the spiral spring 49 surrounding the sleeve 41.

The looped ends of the handle arms 11 and 12 when swung away from each other serve to separate the supporting arms 13 and 14 and such action of the crossed members 8 and 9 may be termed the opening of the device, under which action the egg-receiving cups 15 and 16 are separated.

Preparatory to opening the device, the cutter-arm 37 and parts carried thereby are swung outwardly and reversed so that they assume the position shown in dotted lines in Fig. 3, thus the device is free to receive into the cups an egg preparatory to de-shelling the same.

Contact of the hands with the hot eggs boiled in a pan is not necessary, since when the device is opened, the two egg-receiving cups may be positioned at opposite ends of eggs and when closed will automatically co-axially position the eggs with the axes of the egg-receiving cups so that they have a common axis and due to the fact that the walls of the cups are resilient and flexible, the cups will tightly close upon the egg when closing the device, after which it is merely necessary to swing the cutter-arm 37 with its supporting elements from the position shown in dotted lines in Fig. 3 to that shown in full lines, it being only necessary to place a finger within a loop 52 at the free or outer end of the cutter-arm 37 and press the cutter or knife 47 inwardly through the shell of the egg. The adjustment for an average size egg will bring the stop lug 29 on the handle arm 11 against the inner edge of the handle member 12, after which by means of the finger loop 52, the cutter mechanism or carrier structure may be swung orbitally and the cutter or knife positioned between the free inner edges of the cups 15, 16 with assurance that the shell of the egg will be circumferentially severed into two parts or halves, while the egg is retained within the cups. After a complete orbital movement of the cutter means, opening of the device will result in the two parts of the shell of the egg moving outwardly with their respective cups while the meat of the egg will automatically become released from the shell parts and may be deposited directly into a pan for use in any form in which it is to be served.

The two shell parts remaining in the cups are easily removed and the operation described can then be repeated, permitting one egg after another to be de-shelled without the hand of the user of the device coming in contact with the meat of the egg; the only contact with any portion of the egg being to remove the two shell parts after the meat of the egg is automatically delivered from the device on opening the latter.

Having thus described our invention what we claim is:

1. A device of the class described including two members crossed intermediate their ends and pivotally connected at their point of crossing providing spaced apart opposing supporting arms at one side of the pivotal connection and spaced apart handle portions at the other side of said connection so that upon movement of the handle portions toward and from each other like movements will be imparted to said supporting arms, a pair of cup-like members disposed at substantially right angles to outer end portions of said supporting arms with their open ends in confronting relation, said cup-like members each having a stem portion fixedly secured thereto and projecting axially thereof from its closed end, the stem portion of each of the cup-like members being fixedly secured at its outer end to the outer end portion of one of said supporting arms, the cup-like members being of a shape to receive therein opposite end portions of a boiled egg and to grip and fixedly hold the same against movement with a narrow medial circumferential area of the egg shell exposed to view when said handle portions are grasped in one hand and held pressed toward each other, and a cutter device including a support member having an inner part rotatably mounted at one end on the stem portion of one of the cup-like members inwardly of the associated supporting arm for rotation on the stem portion and extending radially therefrom, and the support member having an outer part extending laterally in spaced relation to the side wall of said last mentioned cup-like member, and a cutter mounted on said laterally extending outer part of the support member at a point slightly beyond the plane of the open end of said last mentioned cup-like member for cutting engagement with the exposed medial circumferential area of the shell of an egg held by the cup-like members whereby an operator can with one hand grasp said handle portions and hold an egg firmly clamped from movement in said cup-like members and with the other hand rotate said support member to move the cutter circumferentially about and in cutting engagement with the exposed medial portion of the shell of the egg to sever the egg shell in two parts.

2. A device of the construction defined in claim 1 and in which there is a finger grip portion on the outer laterally extending part of the support member to the outer side of the cutter.

3. A device of the construction defined in claim 1 and in which the outer laterally extending part of the support member has a cutter bar on which the cutter is directly mounted and which cutter bar is pivotally connected to the laterally extending part of the support member for pivotal movement laterally thereof in a vertical plane and providing for movement of the cutter bar and cutter laterally to one side of the adjacent cup-like member.

4. A device of the construction defined in claim 1 and in which the handle portions of said crossed pivotally connected members have cooperating means thereon for limiting the extent of movement of the handle portions toward each other.

5. A device of the construction defined in claim 3 and in which there is releasable means for locking the cutter bar to the outer laterally extending part of the support member with the cutter bar extending longitudinally of and beyond the outer end of said outwardly extending part and with the cutter in operative position relative to the cup-like egg engaging members.

References Cited in the file of this patent

UNITED STATES PATENTS

| | | |
|---|---|---|
| 808,507 | Blue | Dec. 26, 1905 |
| 1,361,121 | Weiss | Dec. 7, 1920 |
| 1,727,465 | Hamilton | Sept. 10, 1929 |
| 2,481,579 | Dolezal | Sept. 13, 1949 |